Patented June 7, 1949

2,472,434

UNITED STATES PATENT OFFICE 2,472,434

METHOD OF PREPARING VINYL ESTERS OF POLYCARBOXYLIC ACIDS

Alphonse Pechukas, Akron, Ohio, assignor to Pittsburgh Plate Glass Company, Allegheny County, Pa., a corporation of Pennsylvania No Drawing. Application August 24, 1946, Serial No. 692,923

7 Claims. (Cl. 260—485)

This invention relates to the preparation of vinyl esters of polycarboxylic acids. Since vinyl alcohol does not exist as such, the production of esters of this type commonly has been attempted by use of acetylene. Such processes have been effective for the production of esters such as vinyl acetate or monovinyl esters of polycarboxylic acids. However, the production of divinyl esters of polycarboxylic acids by such methods has been rare.

In accordance with the present invention it has been found that when salts of polycarboxylic acids such as dicarboxylic acids, are reacted with vinyl chloroformate or other vinyl haloformate, the corresponding divinyl or polyvinyl ester is produced. Approximately one mol of vinyl haloformate reacts with one equivalent weight of the salt in such reaction. However, excesses of either reactant does not appear to be objectionable.

The reaction is generally conducted by permitting a mixture of the carboxylic acid salt and the vinyl haloformate to stand at room temperature. Where necessary the reaction may be initiated by a preliminary heating which may be discontinued after reaction has commenced as shown by evolution of carbon dioxide. The temperature of reaction is capable of some variation and may, if desired, be conducted either above or below room temperature usually within the range of 0 to 100° C. Excessive temperatures are usually objectionable.

The process may be carried out in the presence of suitable inert solvents or diluents capable of dissolving the salt and/or the haloformate, in order to facilitate contact of the reactants and therefore to promote reaction. Suitable solvents for this purpose include ether, acetone, chloroform, benzene, toluene, or xylene. However, numerous other organic solvents may be used as will be understood by those skilled in the art.

The process herein contemplated may be aptly illustrated by the following examples:

Example I

A mixture of 27.4 grams of di-sodium succinate, 47 grams of vinyl chloroformate and 50 cc. of absolute ether was placed in a flask under a water-cooled reflux condenser and the mixture was warmed to approximately 50° C. on a water bath. After reaction was initiated as indicated by evolution of carbon dioxide, the mixture was allowed to stand at room temperature for 34 hours and thereafter was refluxed at 40 to 55° C. for 6 hours. Thereupon the mixture was extracted with 200 cc. of water to dissolve out the salt and succinic anhydride and the ether layer was separated and dried over calcium chloride The dried ether layer was fractionated and divinyl succinate thereby obtained.

Example II

A mixture of 38 grams of di-sodium adipate and 35 cc. of vinyl chloroformate was allowed to stand at room temperature for 24 hours. The mixture was extracted with ether after standing and the ether extract was fractionated. One of the fractions was found to be divinyl adipate in substantial yield.

It will be understood that where necessary to inhibit polymerization of the vinyl group, the process may be conducted in the presence of polymerization inhibitors such as cuprous chloride or other convenient polymerization inhibitor which does not take part in the reaction. Moreover, the reaction mixture may be agitated continuously or from time to time in order to facilitate contact of the reactants and to speed reaction.

The process illustrated by the above examples may be applied to the production of vinyl esters of numerous carboxylic acids. For example, the salts of other carboxylic acids such as the sodium salt of maleic, fumaric, itaconic, acetylene dicarboxylic, tartaric, phthalic, oxalic, succinic, sebacic, citric, azelaic acids, etc., may be used in lieu of the salts used in Examples I and II and in substantially the same molecular proportions. The yield of the vinyl ester decreases substantially with increase in the chain length and number of carboxyl groups in the salt. In order to secure yields of commercial significance, it is preferred to react the vinyl haloformate with a salt of an acid which contains not more than 10 carbon atoms in an aliphatic chain and preferably not more than 2 carboxyl groups. The salts generally used are salts of weak acids which have disassociation constants generally below about 0.5 and preferably below about 0.2.

Mixed esters may be obtained by reaction of the vinyl haloformate with the sodium salts of partial esters such as sodium methyl phthalate, sodium allyl maleate, sodium allyl succinate, etc.

Although the invention has been described with particular reference to the production of the herein contemplated esters from sodium salts, it is also possible to produce these esters from salts of other alkali metals such as the corresponding ammonium, potassium or lithium salts. Moreover, salts of other metals including salts of magnesium, silver, copper, barium, strontium, calcium, zinc, or lead may be used. Additionally the corresponding bromoformate or other haloformate may be used in lieu of vinyl chloroformate in the above process.

Although the present invention has been described with reference to the specific details of certain embodiments thereof, it is not intended that such details shall be regarded as limitations upon the scope of the invention except insofar as included in the accompanying claims.

I claim:

1. A method of preparing a vinyl ester, which comprises reacting a vinyl haloformate with a salt of a polycarboxylic acid, whereby to evolve carbon dioxide and to produce a vinyl ester of the polycarboxylic acid, and recovering said ester.

2. A method of preparing a vinyl ester, which comprises reacting an alkali metal salt of a dicarboxylic acid with vinyl chloroformate, whereby to evolve carbon dioxide and to produce a divinyl ester of the dicarboxylic acid, and recovering said ester.

3. A method of preparing a vinyl ester, which comprises reacting a sodium salt of a polycarboxylic acid with vinyl chloroformate, whereby to evolve carbon dioxide and to produce a vinyl ester of the polycarboxylic acid, and recovering said ester.

4. A method of preparing a vinyl ester which comprises mixing vinyl chloroformate with a salt of a polycarboxylic acid which contains not more than ten carbon atoms in an aliphatic chain whereby to evolve carbon dioxide and to produce a polyvinyl ester of a polycarboxylic acid and recovering said ester.

5. The process of claim 4 wherein the acid is an acid of the group consisting of adipic and succinic acid.

6. A method of preparing a vinyl ester which comprises reacting di-sodium succinate with vinyl chloroformate whereby to produce divinyl succinate.

7. A method of preparing a vinyl ester which comprises reacting a vinyl chloroformate with a salt of a dicarboxylic acid which contains not more than 10 carbon atoms in an aliphatic chain whereby to evolve carbon dioxide and to produce a vinyl ester of a carboxylic acid and recovering said ester.

ALPHONSE PECHUKAS.

REFERENCES CITED

The following references are of record in the file of this patent:

UNITED STATES PATENTS

| Number | Name | Date |
|---|---|---|
| 2,155,590 | Garvey | Apr. 25, 1939 |
| 2,273,891 | Pollack et al. | Feb. 24, 1942 |
| 2,377,111 | Strain et al. | May 29, 1945 |

OTHER REFERENCES

Otto et al., "Berichte," vol. 21 (1888), pp. 1516–1518.

Einhorn, "Berichte," vol. 42 (1909), pp. 2772–2773.